Feb. 2, 1965 JEAN-FÉLIX PAULSEN 3,168,319
PACKING FOR USE BETWEEN TWO PARTS COAXIALLY
SURROUNDING EACH OTHER
Filed March 26, 1963
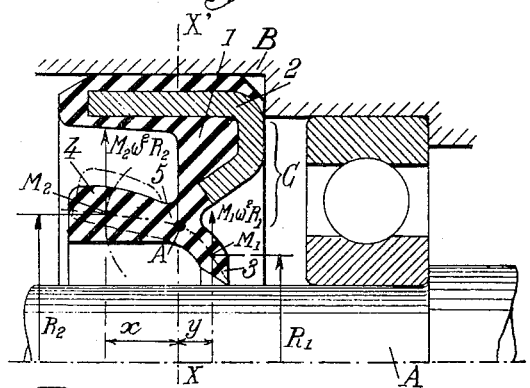
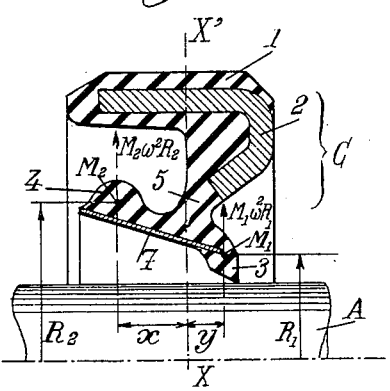
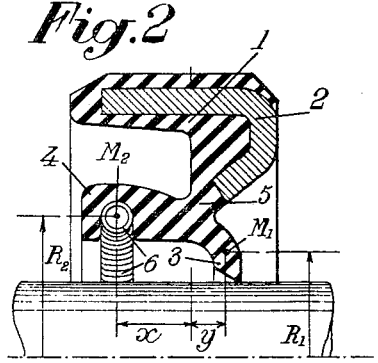
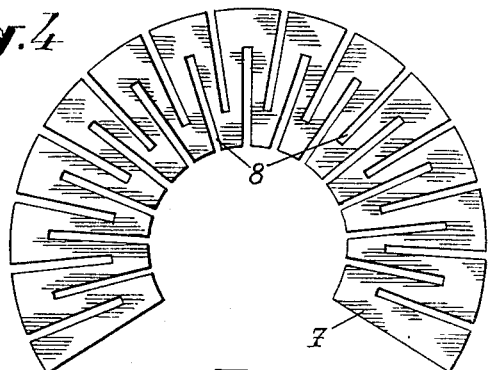
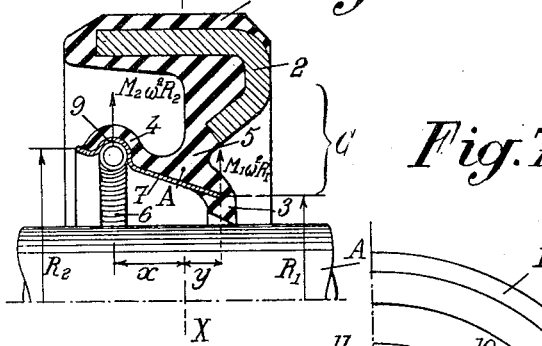
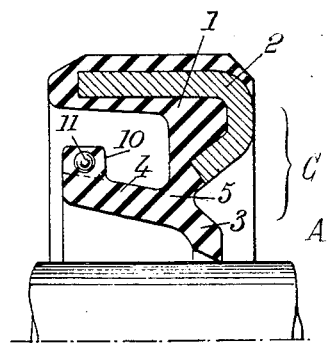
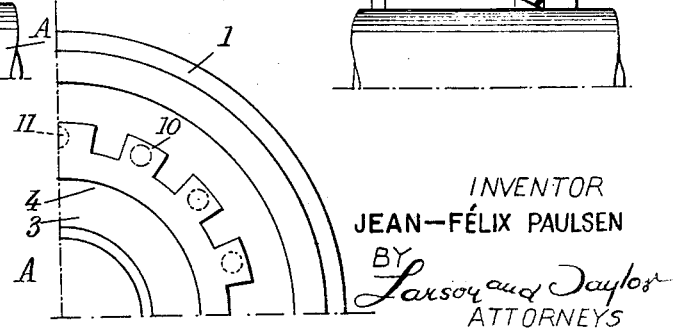
INVENTOR
JEAN—FÉLIX PAULSEN
BY
*Larson and Taylor*
ATTORNEYS

United States Patent Office 3,168,319
Patented Feb. 2, 1965

3,168,319
PACKING FOR USE BETWEEN TWO PARTS
COAXIALLY SURROUNDING EACH OTHER
Jean-Félix Paulsen, Chateaudun, France, assignor to Luxembourgeoise de Brevets et de Participations, Luxembourg, a society of Luxembourg
Filed Mar. 26, 1963, Ser. No. 268,044
Claims priority, application France Apr. 2, 1962
8 Claims. (Cl. 277—25)

The present invention relates to an improved packing for use between two parts coaxially surrounding each other and at least one of which is rotating about their common axis, said packing being secured to said rotating part and including an edge tightly applied against the other of said parts.

The object of the invention is to ensure fluidtightness despite the movement of rotation of said parts with respect to each other.

The invention is characterized by the provision of means carried by said packing and operative by the centrifugal force due to the rotation of said first mentioned part for exerting on said edge a regulating action to apply it suitably in all conditions against said second mentioned part.

Other features of the present invention will become apparent in the following detailed description of some embodiments thereof with reference to the appended drawings given merely by way of example and in which:

FIG. 1 is an axial half section of a first embodiment of the present invention;

FIGS. 2 and 3 respectively show, similarly to FIG. 1, two other embodiments of the present invention;

FIG. 4 is plan view of a reinforcement member to be used in the embodiment of the invention illustrated by FIG. 3;

FIGS. 5 and 6 are views similar to FIGS. 1, 2 and 3 and showing two other embodiments of the invention, respectively;

FIG. 7 is a partial end view corresponding to FIG. 6.

The object of the present invention is to provide a packing between a shaft A, either stationary or rotating, and a rotating part B coaxial with said shaft and surrounding it, the packing joint being carried by part B together with which it rotates.

It will first be reminded that, generally packings are secured to the fixed part and in sliding contact with the rotating part or shaft. Such joints generally include a resilient edge, or lip, applied against the shaft along a circumference. Contact without play between the shaft and said packing edge ensures fluidtightness along this shaft between the portions thereof located on opposite sides of the packing.

However, in some mechanisms, it may happen that the packing is carried by a piece rotating with respect to another piece which may be fixed or rotating. This is the case of a wheel hub or of bearings rotating about a fixed spindle.

The conditions of operation are then different because account must be taken of the fact that the centrifugal force acts upon the sealing lip in a manner tending to modify the conditions of contact of said lip with the part with which it is to cooperate.

In the case, which will be more especially considered hereinafter, of a packing mounted on a rotating part surrounding a shaft, either fixed or movable, the centrifugal force tends to move the resilient edge of the packing away from the shaft against which it is to be applied and everything then takes place as if the packing were mounted with an insufficient contact, fluidtightness being no longer ensured.

The conditions would be reversed if the packing were carried by a rotating part mounted inside a hollow shaft. In this case, the centrifugal force would tend to apply the edge of the packing against the shaft and in some cases, this might involve an excessive pressure.

In order to obviate these drawbacks, according to the present invention, the packing comprises means capable, under the effect of the centrifugal force, of exerting on said edge the desired correcting action.

In the case which will be specifically described hereinafter (rotating part surrounding a shaft), this action must tend to increase the pressure with which the packing edge is applied against the shaft. In the reverse case this action would tend to reduce said pressure.

Referring to FIG. 1 a rotating part B is mounted coaxially about a shaft A, with a packing C interposed between A and B. This packing C comprises a body 1 of rubber or another elastomer provided with a reinforcement 2, with at least one edge 3 applied against shaft A, to ensure fluidtightness. In this case the means according to the present invention consists of at least one balancing mass 4 disposed on the other side of edge 3 from the root 5 of said edge.

This mass 4 consists of a toroidal portion of rubber or another elastomer, the conditions of operation being as follows:

If $M_1$ and $M_2$ are the respective masses of edge 3 and balance mass 4, $R_1$ and $R_2$ the radii of the centers of gravity of said masses respectively and $y$ and $x$ the axial distances of said centers of gravity from a center of bending A located in the vicinity of root 5, the following relations may be written.

Mass $M_2$ subjected to the centrifugal force $M_2\omega^2 R_2$ creates a bending moment $C_2$ given by the formula:

$$C_2 = (M_2\omega^2 R_2 - F_2)x$$

where $F_2$ is the resilient reaction due to the increase of the circumference of balance mass 4, which increase is a function of $\omega^2 R_2$. Moment $C_2$ has for its effect to develop, in the neutral fibre located at $M_2A$, a pulling force of a direction opposed to that of the pulling force developed in fibre $AM_1$ by the bending moment $C_1$:

$$C_1 = (M_1\omega^2 R_1 - F_1)y$$

this moment $C_1$ resulting itself from the centrifugal force due to the increase of the circumference of edge 3, and $F_1$ being the resilient reaction of this edge.

Forces $F_2$ and $F_1$, which are opposed to the centrifugal force are of the following form (for instance for $F_2$)

$$F_2 = \alpha G S_2 \frac{\Delta R_2}{R_2 + \Delta R_2}$$

where:

G is the modulus of elasticity,
$S_2$ is the cross section area of the edge of the balance mass 4,
$\alpha$ is a coefficient without dimension of the form:

$$\alpha = f\left(\frac{S_2}{S'_2}\right)$$

which means that $\alpha$ is a function of the ratio of the values of the cross section areas of the edge of balance mass 4, respectively in the state of rest and after elongation.

In this embodiment of the invention, any increase of the centrifugal force acting upon edge 3 and tending to move it away from shaft A may be compensated for by a force at least equal to, or greater than, said centrifugal force, and which, by creating a tension in the neutral fibre located between $M_2$ and $M_1$, has for its effect to maintain edge 3 in, or to return it into, its normal position.

In a general manner the condition to be complied with is:

$$C_2 \geqslant C_1$$

that is to say $$\left(M_2\omega^2 R_2 - \alpha G S_2 \frac{\Delta R_2}{R_2}\right)_x \geqslant \left(M_1\omega^2 R_1 - \alpha S_1 C \frac{\Delta R_1}{R_1}\right)_y$$

which, at the limits leads to chose:

$$x \geqslant y$$
$$M_2 \geqslant M_1$$
$$R_2 \geqslant R_1$$

It goes without saying that the above described embodiment of the invention constitutes only an example thereof and that, in particular, any means may be used for increasing, reducing, or correcting the regulating centrifugal action, said means making use in particular of metal masses, either resilient or not, or in a general manner of all products forming weights incorporated in the rubber mass and capable of increasing the density of the whole or of distributing it in a suitable manner.

For instance, as shown by FIG. 2, mass $M_2$ carries, incorporated therein, a spring 6 adapted to expand under the action of the centrifugal force.

In the embodiment of FIGS. 3 and 4, there is combined with the packing a reinforcement 7 in the form of a cone which is made suitably deformable by providing it, as shown by FIG. 4, with convergent slits 8.

Under the effect of a radial stress the larger base of this reinforcement 7 may expand whereas the smaller base thereof is contracted. If, as shown by FIG. 3, a resilient tore of mass $M_2$ is disposed on the outside of this reinforcement 7, under the effect of the centrifugal force this mass will exert a moment equal to:

$$C_2 = (M_2\omega^2 R_2)_x$$

with respect to the axis X—X'.

If this moment is chosen greater than the moment of edge 3, which is:

$$C_1 = (M_1\omega^2 R_1)_y$$

the area of the smaller base of the cone frustum will tend to decrease. Consequently the circumference of edge 3 will decrease and it will be applied more tightly against shaft A. According to the desired tightening for its edge, at the limit, the condition will be:

$$(M_2\omega^2 R_2)_x \geqslant (M_1\omega^2 R_1)_y$$

To be perfectly accurate it would be necessary to subtract, from the centrifugal forces that are developed, forces $F_2$ and $F_1$ so as to take into account both the resilient reaction of mass $M_2$ (increase of diameter) and also the resistance of the reinforcement piece to deformation.

According to another embodiment (FIG. 2) mass $M_2$ may be a spring 6 housed in a suitable groove 9 of reinforcement 7.

FIG. 6 shows another embodiment of the invention which comprises a series of projections 10 evenly distributed along the circumference and inside which are secured metal balls in such manner as to give the tore a suitable weight.

Instead of balls, use might also be made of a metal wire embedded in parts 10 and cut, after moulding, in the intervals between said parts 10.

The operation of the device according to this invention results sufficiently clearly from the preceding description to make it unnecessary to insist thereon.

Of course an equivalent arrangement will be used in the case of packings where the edges tend, under the effect of centrifugal force, to be applied more and more against the surfaces on which they are mounted. The balancing means in this case would be mounted in such manner as to tend to move the edges away from said surfaces so as to keep the contact pressure at a suitable value, that is to say not too high a value.

In a general manner, while the above description discloses what are deemed to be practical and efficient embodiments of the invention, said invention is not limited thereto as there might be changes made in the arrangement, disposition and form of the parts without departing from the principle of the invention as comprehended within the scope of the appended claims.

What I claim is:

1. In combination, a first part in the form of a body of revolution about an axis and rotating about said axis, a second part in the form of a body of revolution about the same axis, one of said parts surrounding the other, a resilient packing of annular shape located between said two parts, said packing being secured to said first part and having an annular edge portion applied against the other part to ensure fluidtightness therewith, and means carried by said packing and responsive to the centrifugal force developed by the rotation of said first part for exerting on said edge portion a balancing action to keep it in tight sliding contact against said second part.

2. In combination, a first part in the form of an annular body of revolution about an axis and rotating about said axis, a second part in the form of a shaft of revolution about the same axis, surrounded by said first part, a resilient packing of annular shape located between said part and said shaft, said packing being secured to said part and having an annular edge portion applied against said shaft to ensure fluidtightness therewith, and means carried by said packing and responsive to the centrifugal force developed by the rotation of said part for exerting on said edge portion a balancing action to keep it in tight sliding contact against said shaft.

3. In combination, a first part in the form of an annular body of revolution about an axis and rotating about said axis, a second part in the form of a shaft of revolution about the same axis, surrounded by said first part, a packing of annular shape made of a rubber material located between said first part and said shaft, said packing being secured to said first part and including an inwardly projecting annular portion the edge of which is applied against said shaft to ensure fluidtightness therewith, and means, carried by said packing on the other side of the root of said annular portion from said edge thereof, responsive to the centrifugal force developed by the rotation of said part for exerting on said edge a balancing action to keep it in tight sliding contact against said shaft.

4. In combination, a first part in the form of an annular body of revolution about an axis and rotating about said axis, a second part in the form of a shaft of revolution about the same axis, surrounded by said first part, a packing of annular shape made of a rubber material located between said first part and said shaft, said packing being secured to said first part and including an inwardly projecting annular portion the edge of which is applied against said shaft to ensure fluidtightness therewith, and means carried by said packing on the other side of the root of said annular portion from said edge thereof, responsive to the centrifugal force developed by the rotation of said part for exerting on said edge a balancing action to keep it in tight sliding contact against said shaft, said means comprising a toroidal extension of said joint.

5. A combination according to claim 4 where said means further comprise a resilient metallic reinforcement.

6. A combination according to claim 4 where said means further include masses adapted to increase the action of the centrifugal force.

7. A combination according to claim 4 where said toroidal extension is in the form of a frustum of a cone, said means further comprising a deformable metal reinforcement, also in the form of a frustum of a cone.

8. A combination according to claim 4 where said means further include a helical metal spring.

References Cited in the file of this patent

UNITED STATES PATENTS

| | | |
|---|---|---|
| 2,637,574 | Diehl | May 5, 1953 |
| 2,665,929 | Sawyer | Jan. 12, 1954 |
| 2,888,281 | Ratti | May 26, 1959 |